United States Patent
Fehrenbach et al.

(10) Patent No.: US 9,739,877 B2
(45) Date of Patent: Aug. 22, 2017

(54) TOPOLOGY DETERMINATION FOR BULK MATERIALS

(71) Applicant: VEGA Grieshaber KG, Wolfach (DE)

(72) Inventors: Josef Fehrenbach, Haslach (DE); Karl Griessbaum, Muhlenbach (DE); Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 484 days.

(21) Appl. No.: 14/276,536

(22) Filed: May 13, 2014

(65) Prior Publication Data
US 2014/0340259 A1    Nov. 20, 2014

(30) Foreign Application Priority Data
May 17, 2013   (EP) .................................. 13168357

(51) Int. Cl.
| | | |
|---|---|---|
| *G01S 13/58* | (2006.01) | |
| *G01S 13/02* | (2006.01) | |
| *G01F 23/284* | (2006.01) | |
| *G01S 13/42* | (2006.01) | |
| *G01S 13/88* | (2006.01) | |

(52) U.S. Cl.
CPC ............ *G01S 13/02* (2013.01); *G01F 23/284* (2013.01); *G01S 13/42* (2013.01); *G01S 13/88* (2013.01)

(58) Field of Classification Search
CPC .................................. G01S 13/02; G01S 13/42
USPC ........................................................ 342/124
See application file for complete search history.

(56) References Cited

U.S. PATENT DOCUMENTS

| | | | | |
|---|---|---|---|---|
| 4,219,814 A | * | 8/1980 | Johnson | .................... C21B 7/24 |
| | | | | 266/86 |
| 6,986,294 B2 | * | 1/2006 | Fromme | ................. G01B 11/24 |
| | | | | 73/865.8 |
| 8,332,182 B2 | * | 12/2012 | Fehrenbach | ............ G01F 23/28 |
| | | | | 702/166 |
| 2009/0299662 A1 | * | 12/2009 | Fehrenbach | ............ G01F 23/28 |
| | | | | 702/55 |
| 2010/0070208 A1 | * | 3/2010 | Sai | ......... G01F 23/284 |
| | | | | 702/55 |
| 2010/0182190 A1 | * | 7/2010 | Spanke | ................. G01F 23/284 |
| | | | | 342/124 |
| 2010/0223019 A1 | * | 9/2010 | Griessbaum | .......... G01F 23/284 |
| | | | | 702/75 |
| 2011/0109496 A1 | * | 5/2011 | Van Den Berg | ..... B22D 11/041 |
| | | | | 342/124 |

(Continued)

FOREIGN PATENT DOCUMENTS

| | | |
|---|---|---|
| DE | 3 735 905 | 5/1989 |
| DE | 4 339 441 | 5/1995 |
| DE | 10 2004 041 857 | 3/2006 |

(Continued)

*Primary Examiner* — Marcus Windrich
(74) *Attorney, Agent, or Firm* — Fay Kaplun & Marcin, LLP

(57) ABSTRACT

For determining the topology of a bulk material surface, a series of echo curves are detected in different primary radiation directions of the antenna. Subsequently, for each distance cell of the echo curves, the maximum of all of the echo curves is determined and the distance thereof is plotted as a function of the coordinates thereof so as to obtain an image of the topology of the bulk material surface in two or three dimensions.

12 Claims, 10 Drawing Sheets

(56) References Cited

U.S. PATENT DOCUMENTS

2013/0060528 A1* 3/2013 Portman ............. G01F 23/2928
 702/191

FOREIGN PATENT DOCUMENTS

| | | |
|---|---|---|
| DE | 10 2011 075826 | 11/2012 |
| EP | 2 090 387 | 8/2009 |
| EP | 2 128 576 | 12/2009 |
| EP | 2 315 045 | 4/2011 |
| FR | 2 907 546 | 4/2008 |
| WO | 2010 003656 | 1/2010 |

* cited by examiner

TOPOLOGY DETERMINATION FOR BULK MATERIALS

REFERENCE TO RELATED APPLICATIONS

This application claims the benefit of the filing date of EP Patent Application Serial No. 13 168 357.5 filed on 17 May 2013, the disclosure of which is hereby incorporated herein by reference.

FIELD OF THE INVENTION

The present invention relates to level measurement. In particular, the invention relates to a measurement device for determining the topology of a bulk material, to the use of a measurement device for determining a volume flow of a bulk material, to the use of a measurement device for determining the mass of a bulk material, to a method for determining the topology of a bulk material, to a program element and to a computer-readable medium.

TECHNICAL BACKGROUND

Bulk materials which are stored in a container or located on a conveyor belt generally have an irregular, uneven surface. In particular, a bulk peak or a hollow trough may be formed.

In this situation, level measurement devices often determine the level inaccurately if merely the distance from a single point on the filling material surface is determined.

SUMMARY OF THE INVENTION

A first aspect of the invention relates to a measurement device for determining a bulk material, which comprises an antenna arrangement, an echo curve generating unit, a positioning device and an evaluation unit.

The antenna arrangement is configured for emitting a transmission signal in a primary radiation direction of the antenna arrangement and for receiving the transmission signal reflected at least on a surface of the bulk material. The transmission signal reflected and then received by the antenna arrangement may also be referred to as a reception signal.

The echo curve generating unit is configured for generating an echo curve from the transmission signal which is reflected and then received by the antenna arrangement. In this context, the echo curve minors (i.e. corresponds to) the signal strength or amplitude of the reflected transmission signal over a distance measurement range of the measurement device. In other words, the echo curve images the dependency of the amplitude of the received, reflected transmission signal on the path length covered by the corresponding signal portion from the emission of the transmission signal to the reception thereof by the antenna.

An echo curve of this type generally has a maximum (peak) which originates from the reflection of the transmission signal on the filling material surface. There may also be further maxima in the echo curve, which originate from reflections on interference points in the container etc.

The measurement device or at least the antenna thereof is controllable by means of the positioning device, in such a way that the primary radiation direction of the antenna arrangement can be changed by means of the positioning device, in such a way that a series of echo curves can be generated at different primary radiation directions. In particular, a single, mechanically or electronically "pivotable" antenna may be provided. In the case of mechanical positioning of the antenna, no antenna array is required. In the case of electronic positioning of the antenna, an array of individual antennas is combined to form an overall radiation device, for example.

The topology of the bulk material surface can subsequently be determined by means of the evaluation unit. In this context, the "topology" of the bulk material surface or of the bulk material means the surface profile, in other words the surface progression of the bulk material surface. The surface progression can be determined along a line by one-dimensional scanning over the surface (the determined surface profile in this case being a planar, vertical section through the surface of the bulk material), or by two-dimensional scanning over the surface, as opposed to the aforementioned one-dimensional scanning over the surface. In this case, the topology of the bulk material surface is thus being determined in three dimensions.

So as now to determine the topology of the bulk material surface in two dimensions or in three dimensions, the evaluation unit carries out at least the following steps:

Initially, a first distance cell is established, which is a particular distance interval in the echo curve, in other words a particular portion of the echo curve. In the next step, in each echo curve of the series of echo curves this distance cell (in other words this particular portion) is analysed, thus making it possible to determine the echo curve which has the greatest signal strength by comparison with the remaining echo curves within the first distance cell. Since each echo curve has actually been received in a particular primary radiation direction, each echo curve can be identified unambiguously by the orientation of the primary radiation direction. The value and optionally the precise position of the greatest signal strength in the distance cell are also determined.

In the following, the coordinates of a measurement point of this type mean the angle characterising the primary radiation direction at which the corresponding echo curve was generated (i.e. the primary radiation direction in which the transmission signal has been emitted by the antenna, before it has been reflected by the surface of the bulk material and received by the antenna in order to be used for generating the echo curve) and the position (the "location") of the greatest signal strength in the echo curve. The value of the signal strength means the amplitude of the echo curve at the location of the greatest signal strength. This "location" is equivalent to the distance corresponding to the greatest signal strength.

The above-disclosed steps may subsequently be carried out for the further distance cells of the echo curves.

It is thus possible to subdivide the echo curves into a plurality of distance cells placed in series, or at least to subdivide a particular portion of the echo curves into a plurality of distance cells for which the above-disclosed steps are carried out.

In other words, a plurality of echo curves are each received at a different angle (in other words at a different primary radiation direction of the antenna arrangement). The primary radiation direction of the antenna arrangement can be provided mechanically by suitably adjusting the antenna arrangement and/or a reflector which reflects the transmission signal on the path thereof from the antenna to the bulk material surface. It is also possible to adjust the primary radiation direction electronically, for example by providing a correspondingly actuated antenna array.

After the series of echo curves is received, the first distance cell of the echo curves is defined, and subsequently, for each echo curve, the maximum of the echo curve in this distance cell is determined. Next, it is determined which maximum of the various echo curves is the greatest maximum, and the coordinates and value thereof are determined. These steps are subsequently carried out for further distance cells. Depending on whether the primary radiation direction of the antenna is changed in one direction or two directions in space, a section line or a three-dimensional representation of the bulk material surface can be calculated from this.

In one embodiment of the invention, the evaluation unit creates a matrix which contains the locations corresponding to the largest maxima of the signal strength for each distance cell and the coordinates (distance, primary radiation direction) thereof.

In a further embodiment of the invention, the evaluation unit determines the level of a bulk material located in a container and/or the volume of the bulk material using the data obtained in the above-disclosed steps.

In a further embodiment of the invention, the positioning device is configured to change the primary radiation direction of the antenna arrangement in two dimensions.

In a further embodiment of the invention, the positioning device is configured to change the primary radiation direction of the antenna arrangement with the assistance of a mechanical adjustment device, by means of which the orientation of the antenna arrangement can be mechanically adjusted.

In a further embodiment of the invention, the positioning device comprises a reflector for changing the primary radiation direction of the antenna arrangement and a mechanical adjustment device for changing the position of the reflector and thus for changing the primary radiation direction of the antenna arrangement.

It may also be provided that both the antenna orientation and the reflector can be adjusted using the positioning device.

In a further embodiment of the invention, the measurement device is configured as a level measurement device. In particular, the measurement device may be configured as a pulsed radar device or an FMCW (frequency-modulated continuous wave) level measurement device.

A further aspect of the invention specifies the use of a measurement device disclosed above and in the following for determining a volume flow of a bulk material which is located on a conveyor belt.

A further aspect of the invention specifies the use of a measurement device disclosed above and in the following for determining the mass of a bulk material.

A further aspect of the invention specifies a method for determining the topology of a bulk material, in which a transmission signal is emitted in a primary radiation direction of the antenna arrangement and the transmission signal reflected at least on a surface of the bulk material is received by the antenna arrangement. Subsequently, an echo curve, which mirrors the signal strength of the reflected transmission signal over a distance measurement range of the measurement device, is generated from the transmission signal which is reflected and then received by the antenna arrangement. Subsequently, the primary radiation direction of the antenna arrangement is changed, in such a way that further echo curves can be generated in different primary radiation directions.

The topology of the bulk material is subsequently determined, at least the following steps being carried out to determine the topology:

a) establishing a first distance cell, which is a particular distance interval;

b) determining the echo curve out of the series of echo curves which has the greatest signal strength within the first distance cell by comparison with the remaining echo curves;

c) determining the value and the coordinates of the greatest signal strength, which are the primary radiation direction, corresponding to the greatest signal strength, in which this echo curve was generated, and the distance corresponding to the greatest signal strength; and d) repeatedly carrying out steps a) to c) for further distance cells.

At this point, it should be noted that the disclosed measurement devices may be configured to carry out all of the method steps disclosed above and in the following.

A further aspect of the invention specifies a program element which, when executed on a processor of a measurement device, instructs the measurement device to carry out the steps disclosed above and in the following.

A further aspect of the invention specifies a computer-readable medium, on which a program element is stored, which, when executed on a processor of a measurement device, instructs the measurement device to carry out the steps disclosed above and in the following.

The program element may be part of a piece of software which is stored on a processor of the measurement device. The invention also relates to a program element which, by way of an update, instructs an existing program to use to the invention.

In the following, embodiments of the invention are described with reference to the drawings.

DETAILED DESCRIPTION OF EMBODIMENTS

Figure 1:
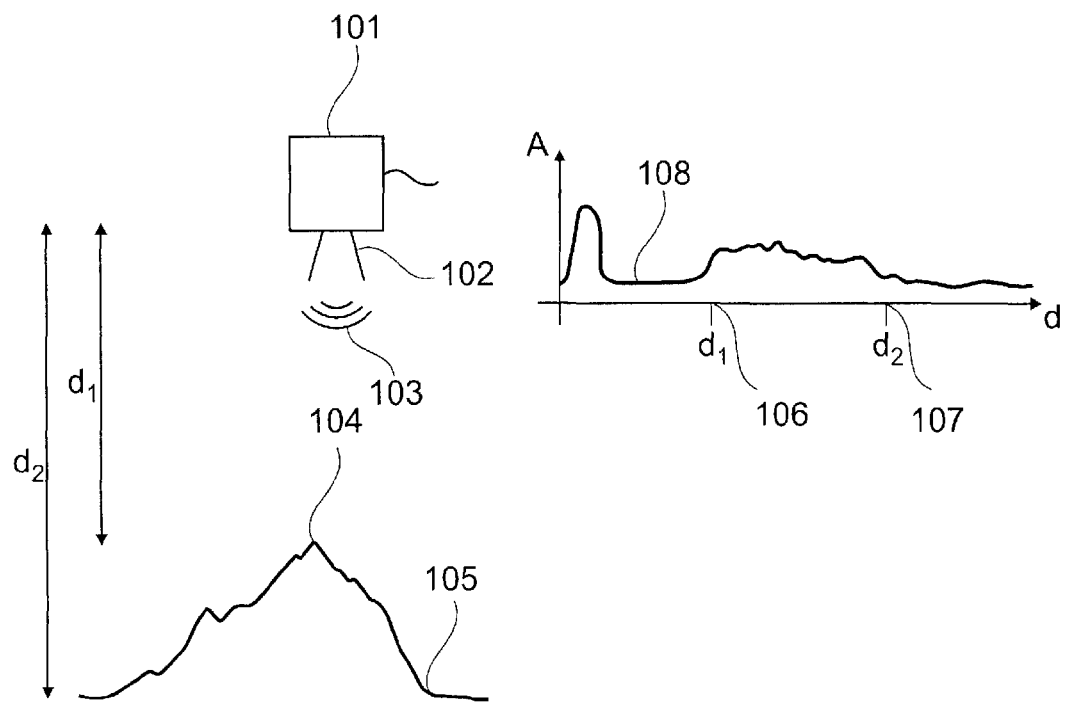
FIG. 1 shows a level measurement device for measuring a level and an echo curve generated by the device.

The drawings are schematic and not to scale.

In the following description of the drawings, where like reference numerals are used in different drawings they denote like or similar elements. However, like or similar elements may also be denoted by different reference numerals.

The present invention is applied in particular in the field of level measurement devices, but application in the field of object monitoring or mass flow determination is also possible. Extending methods for level measurement which merely determine the distance from a particular point on a filling material surface, in such a way that it is possible to determine the topology of a surface, may be considered a core aspect of the invention. Especially in bulk material applications, substantially better measurement results can be obtained as a result, irrespective of how the topology data are to be evaluated in further calculation steps (conceivable options: volume flow measurement on conveyor belts, mass determination in containers etc.).

FIG. 1 shows a typical situation in level measurement in bulk material applications. A conventional level measurement device 101 emits a signal 103 towards the medium to be measured by way of a transceiver unit 102. The signal 103 is reflected at various points 104, 105 on the filling material surface, and after a corresponding transit time reaches the level measurement device 101 again, where it is received in a suitable manner and conventionally converted into an echo curve 108. The echo curve 108 has a very wide echo between the distance $d_1$ 106 and the distance $d_2$ 107. This very wide echo is also known as an echo band. It results from the superposition of a number of individual reflections of the transmission signal 103 on the surface of the bulk material to be measured.

Figure 2:
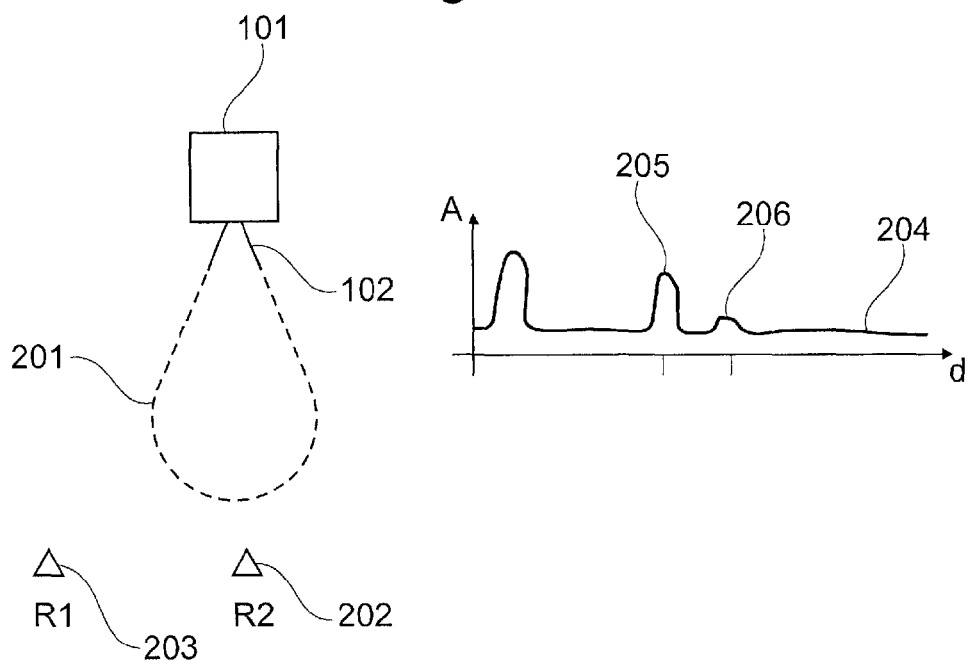
FIG. 2 shows a level measurement device and the directional characteristic thereof and an echo curve generated by the device.
Figure 3A:
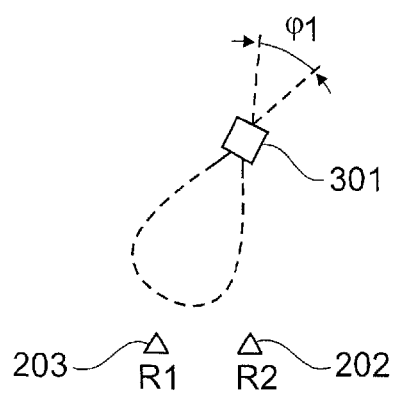
FIGS. 3a, 3b, 3c and 3d show the generation of echo curves in different primary radiation directions.
Figure 3A:
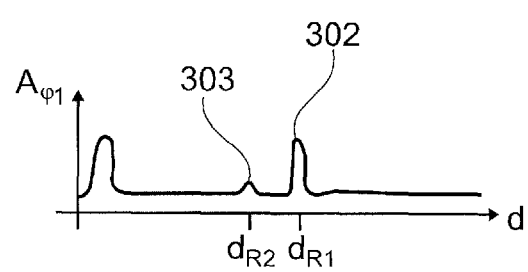
Figure 3B:
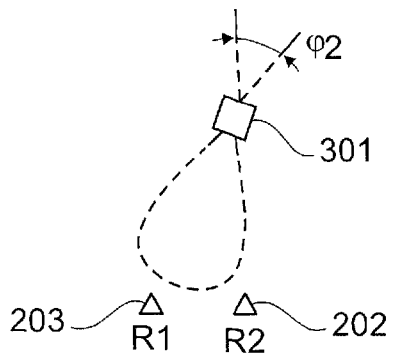
Figure 3B:
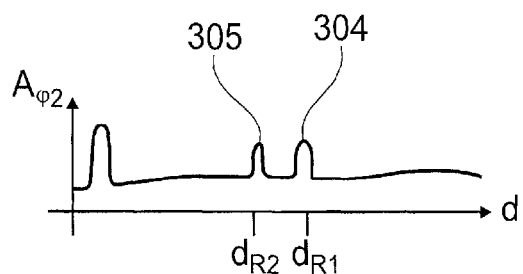
Figure 3C:
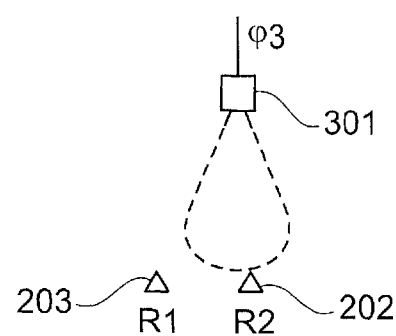
Figure 3C:
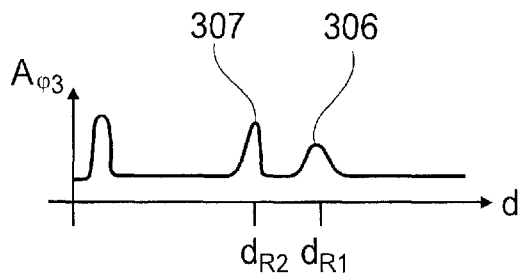
Figure 3D:
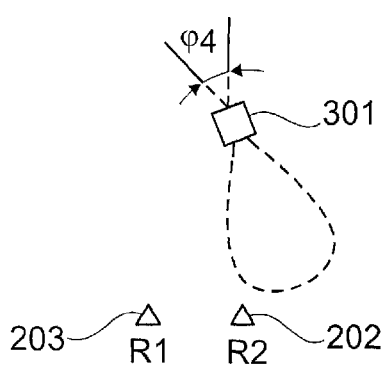
Figure 3D:
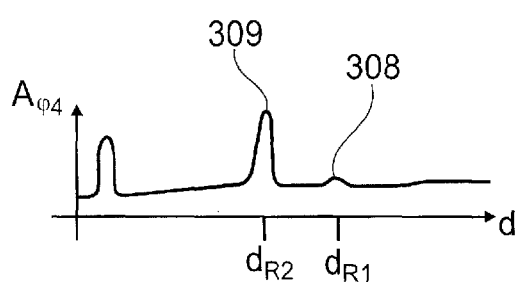

FIG. 2 illustrates the appearance of a plurality of echoes from a signal viewing direction (primary radiation direction) of the level measurement device 101. Depending on the construction of the level measurement device 101 and in particular on the geometry of the duplexer 102, there is a variable sensitivity of the sensor for the different directions in space, and this sensitivity is indicated by the directional characteristic 201 also shown in FIG. 2. The graphically illustrated incomplete focusing of the signals means that, aside from the reflector R2 202 present in the primary radiation direction, the reflector R1 203 somewhat to the side thereof is also being detected in the measurement. From the echo curve 204, the two echoes 205, 206 of the reflectors 202, 203 can be clearly identified. However, it is apparent that the echo 206 of the reflector R1 203 has a much lower amplitude. Aside from the greater distance and the accompanying increased free space attenuation of the signal on the path between the level measurement device and the reflector, the main reason for this is the worse transmission and reception characteristic 201 in the direction of the reflector R1 203 by comparison with the reflector R2 202.

FIG. 3 shows, initially in a two-dimensional plane, a sequence of measurements for carrying out the method according to the invention. The level measurement device 301 according to the invention is orientated in an adjustable direction towards the reflectors R1 203 and R2 202 by way of a suitable mechanical construction.

The level measurement device 301 may start the measurement cycle thereof at an angle of the primary radiation direction of $\phi_{Min}=\phi_1$. At the indicated orientation of the sensor, the echo 302 of the reflector R1 203 is imaged with maximum amplitude, since it is actually located in the primary radiation direction of the sensor 301. On the basis of the current orientation of the sensor, the reflector R2 202 is located to the side of the primary radiation direction, and this explains the much smaller echo 303 thereof.

In the next step, the level measurement device 301 is rotated onwards through an angle $\Delta\phi=\phi_2-\phi_1$ which may be predetermined. As a result of the new primary radiation direction, the echoes (304, 305) of the reflectors R1 and R2 are now detected at approximately the same amplitude.

This is followed by further calibration steps at $\phi=\phi_3$ and $\phi=\phi_4$, the end of the detection range of the measurement being reached in this last step, since $\phi_{Max}=\phi_4$. It can clearly be seen that the maximum amplitudes of the detected echoes 306, 307, 308, 309 are strongly dependent on the position of the associated reflector 202, 203 and on the current orientation of the level measurement device 301.

Figure 4:
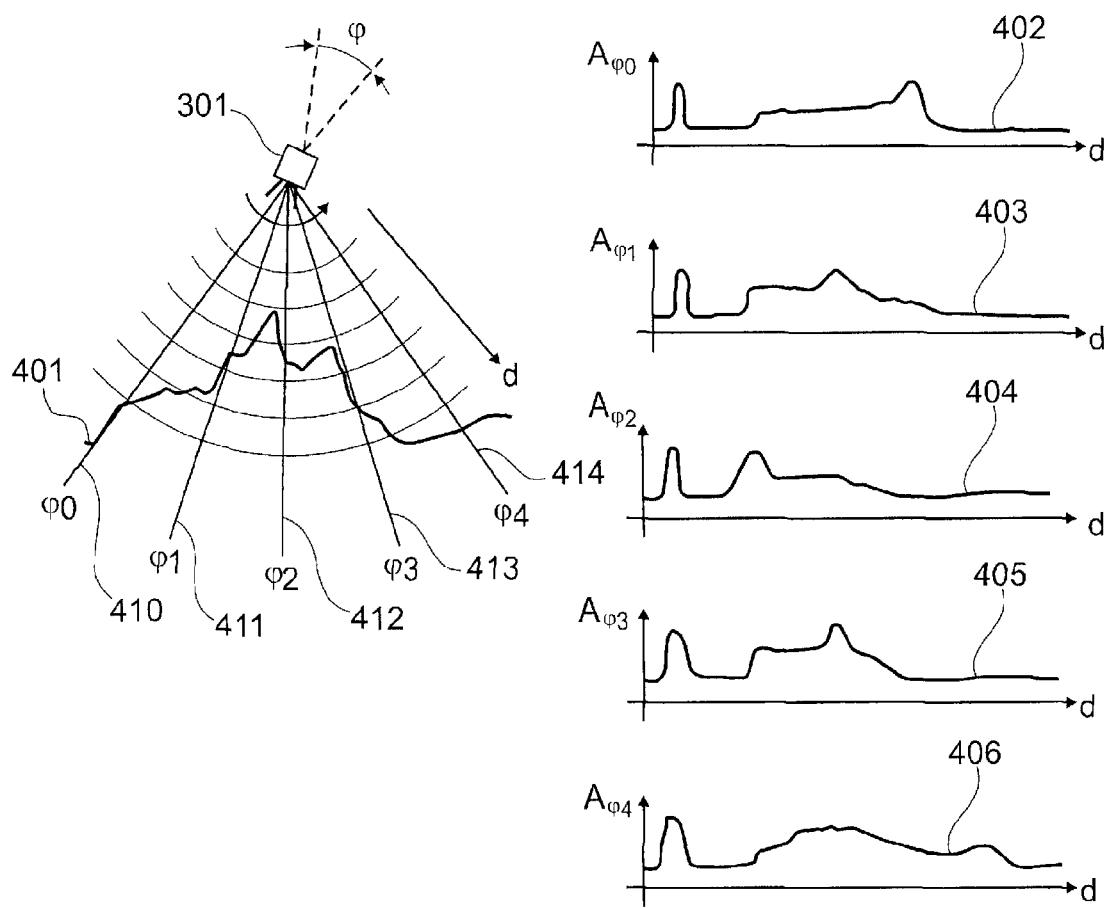
FIG. 4 shows the reception of echo curves in different primary radiation directions.

FIG. 4 now illustrates the transition to a continuously distributed reflection surface 401 of a bulk material pile. For clarity, the method according to the invention is initially shown in a two-dimensional configuration.

The starting point of a measurement cycle is initially detecting a number of echo curves 402, 403, 404, 405, 406 in various primary radiation directions of the duplexer arrangement of the level measurement device, for which purpose the angle range to be detected (in this case: $\phi_{Min}=\phi_0 \ldots \phi_{Max}=\phi_4$) is passed through in a pattern which can be predetermined.

In the example of FIG. 4, the surface 401 of the bulk pile is measured by the sensor from five different viewing directions ($\phi_0$, $\phi_1$, $\phi_2$, $\phi_3$, $\phi_4$), the primary radiation directions 410, 411, 412, 413, 414. The echo curves 402, 403, 404, 405, 406 thus detected are initially stored in a suitable memory.

Figure 5:
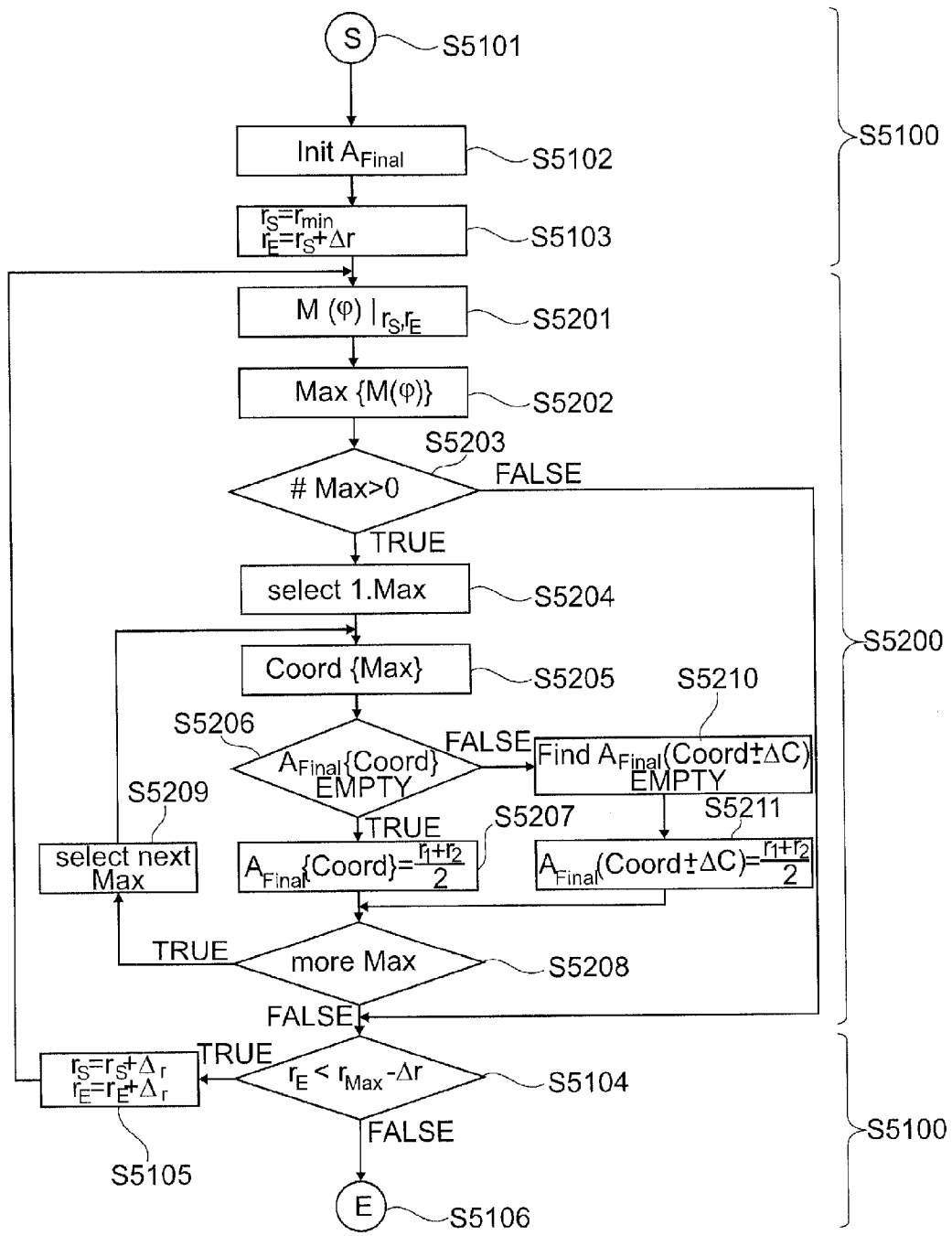
FIG. 5 is a flow chart of a method in accordance with an embodiment of the invention.

Once the echo curve detection is complete, the method according to the invention continues with the actual computational evaluation of the echo curves 402, 403, 404, 405, 406. FIG. 5 shows an associated flow chart.

FIG. 6 to FIG. 10 show major intermediate results in the implementation of the method. The method starts in step S5101. Initially, in step S5102, the results matrix $A_{Final}$ 802 is cleared.

The central idea of the method in the further steps is to evaluate the echo curves (FIG. 5; 402, 403, 404, 405, 406) in distance cells which are fixed in advance. Consequently, in step S5103, the closest distance strip to the sensor is defined as the analysis region (in this case: $\gamma_S=\gamma_1$; $\gamma_E=\gamma_2$).

Figure 6:
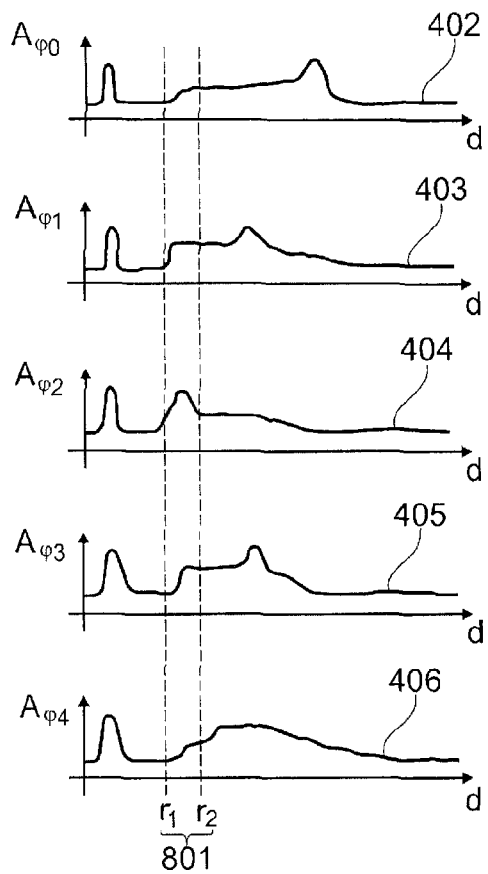
FIG. 6 shows various echo curves, which have been detected in different primary radiation directions, and a first distance cell.
Figure 8:
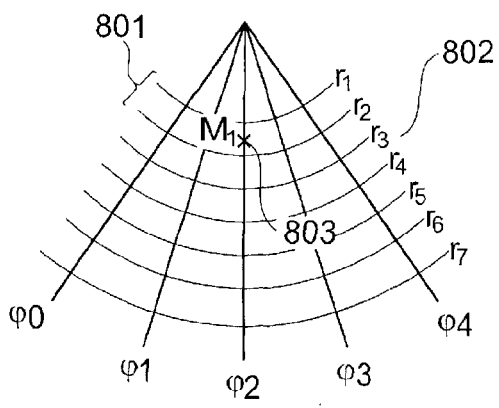
FIG. 8 is a representation of a maximum in accordance with an embodiment of the invention.
Figure 7:
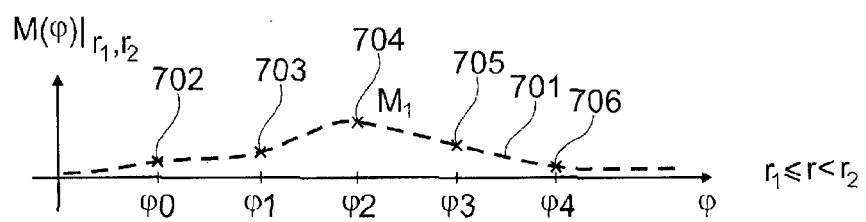
FIG. 7 shows the values of the maxima of the echo curves of FIG. 6 in the distance cell as a function of the angle of the primary radiation direction.

FIG. 6 and FIG. 8 show the distance cells 801 defined in this manner. Subsequently, in step S5201, the maxima curve $M(\phi)|_{\gamma_S,\gamma_E}$ associated with this distance strip 801 is formed. The maxima curve 701 comes about in that, for each angle ($\phi_0$, $\phi_1$, $\phi_2$, $\phi_3$, $\phi_4$), the maximum amplitude (in other words the signal strength) of the associated echo curve 402, 403, 404, 405, 406 is searched for in the distance range 801 defined in advance, and plotted as a sampling point (702, 703, . . . ) for the maxima curve 701.

Subsequently, in step S5202, the local maxima on the maxima curve 701 are determined. In the present case there is a local maximum M1 704. By implementing method steps S5203, S5204, S5205, the polar coordinates of the local maximum M1 704 are determined. In the present case, the polar coordinates are simply $$\left[\frac{r_1+r_2}{2}; \varphi_2\right],$$

since the measurement is only two-dimensional. For three-dimensional measurement, an elevation angle is additionally determined as the third coordinate. In step S5206, it is now checked whether the results matrix 802 at the determined coordinates is already occupied. Since this is not the case, in step S5207 the maximum M1 at the coordinate $$\left[\frac{r_1 + r_2}{2}; \varphi_2\right],$$

is entered in the results matrix 802 (FIG. 8, 803).

In the same way, any further local maxima which may be present are entered in the results matrix 802 (steps S5208, S5209).

In the special case where it is established in step S5206 that the results matrix 802 already has an entry at the determined coordinates, the maximum is entered at the first unoccupied position to the left and right of the detected position of the maximum (S5210, S5211). In the present case, for the occupied position $$\left[\frac{r_1 + r_2}{2}; \varphi_2\right],$$

there would be a double entry at the positions $$\left[\frac{r_1 + r_2}{2}; \varphi_1\right]$$

and $$\left[\frac{r_1 + r_2}{2}; \varphi_a\right].$$

Figure 9:
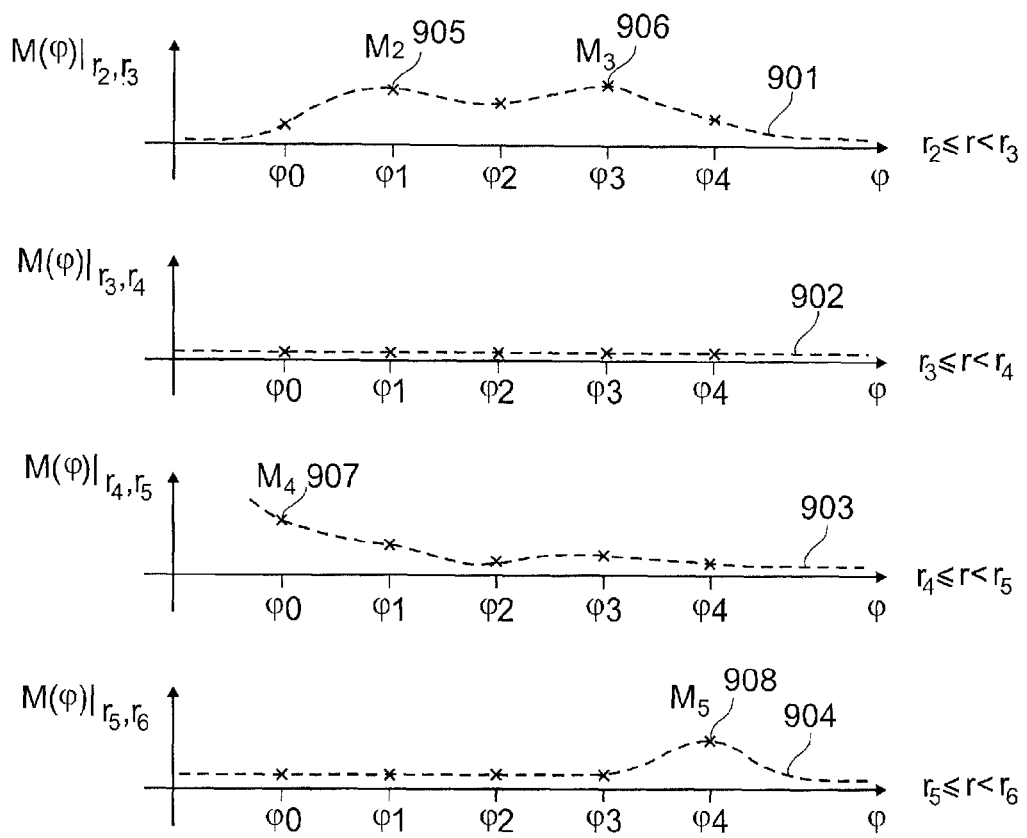
FIG. 9 is a representation of maxima of further distance cells which have been generated in different primary radiation directions.

In step S5104, it is now checked whether all relevant distance cells have now been processed. If this is not the case, in step S5105 the next distance cell is selected and evaluated in the same way. FIG. 9 shows the resulting maxima functions 901, 902, 903, 904.

Figure 10:
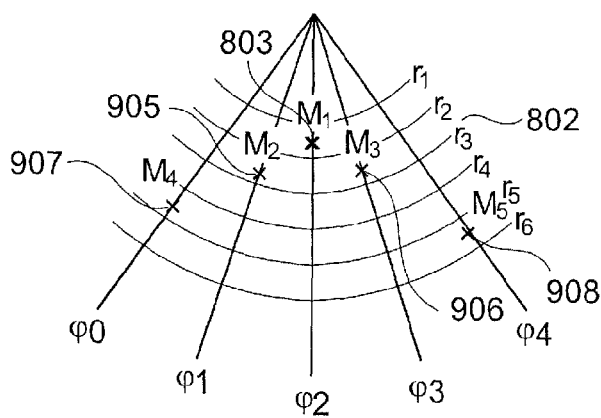
FIG. 10 is the representation of the maxima obtained from FIG. 9 in accordance with an embodiment of the invention.

FIG. 10 shows the local maxima M2, M3, M4 and M5 (905, 906, 907, 908) entered in the results matrix 802.

The determined sampling points 803, 905, 906, 907, 908 generate an image of the topology of the bulk material surface 401. If required, the position of further sampling points can be approximated by known interpolation methods. Further, by known conversion methods, the results matrix (802) can be converted from the representation in polar coordinates into a representation in Cartesian coordinates.

Figure 11:
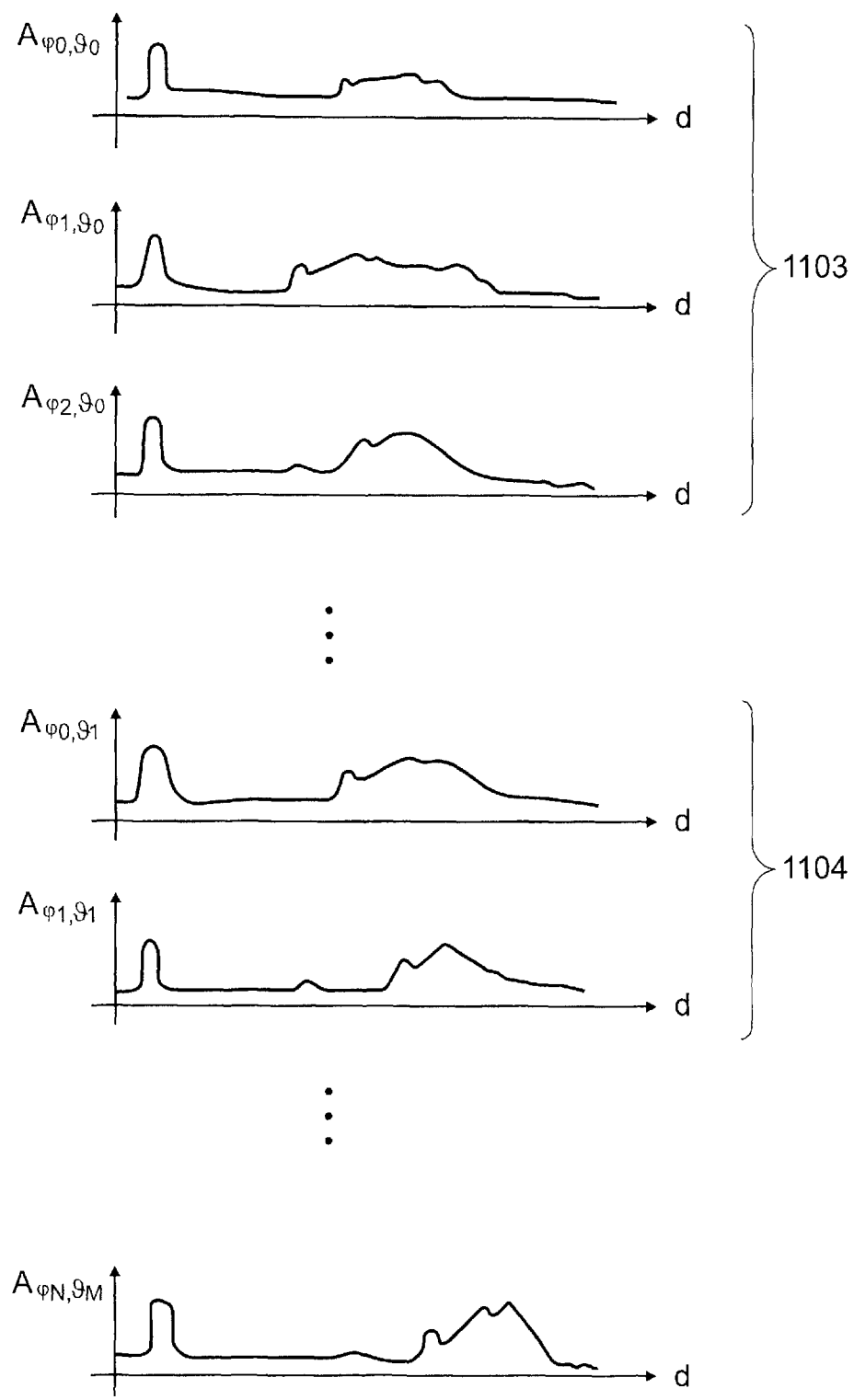
FIG. 11 shows echo curves which have been detected in different primary radiation directions.

The above-described method for determining the topology can be extended to three dimensions. FIG. 11 shows an associated measurement situation for determining the necessary echo curves.

Figure 13:
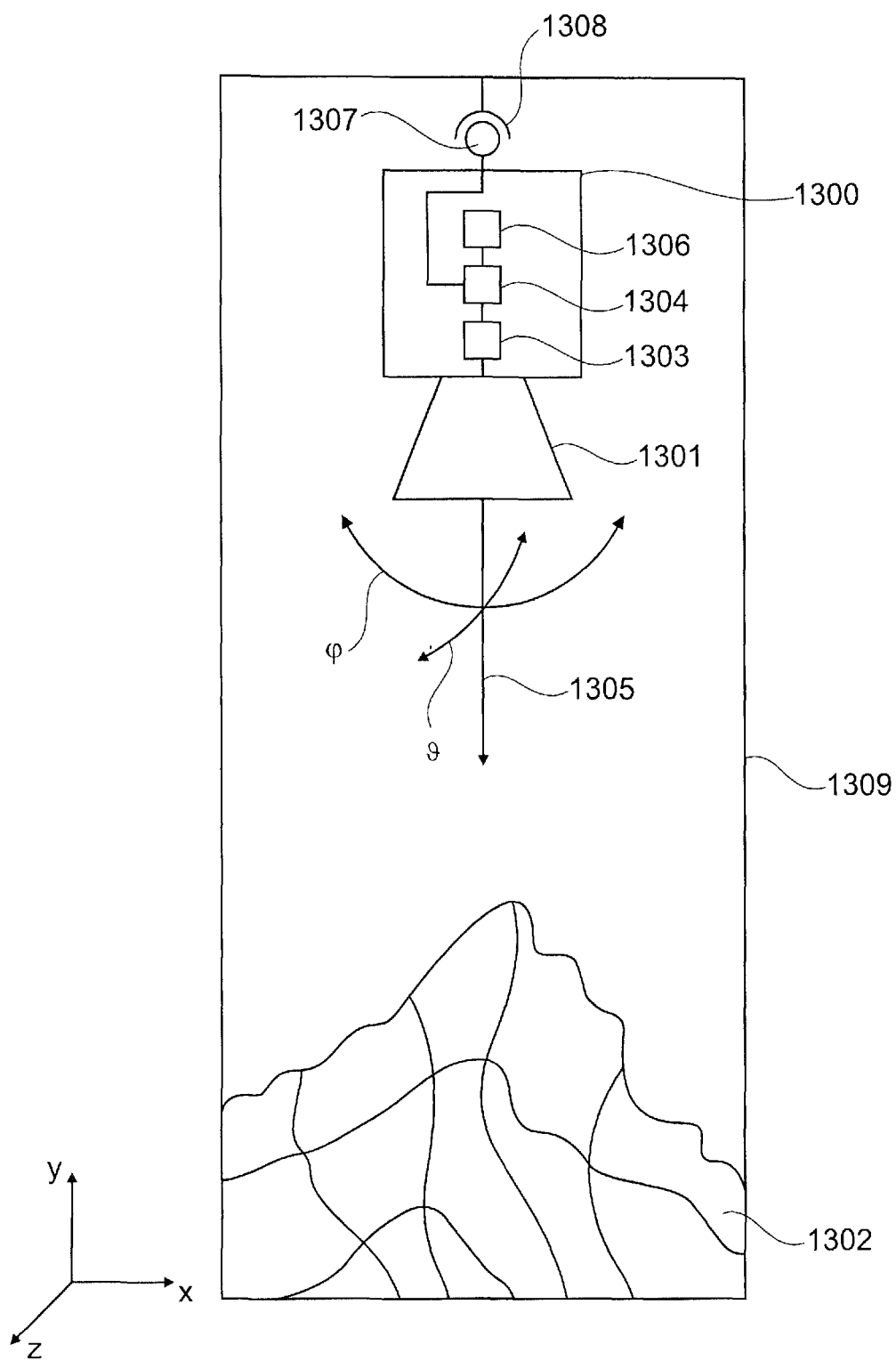
FIG. 13 shows a measurement arrangement in accordance with an embodiment of the invention.

The level measurement device 1300 according to the invention is mounted so as to be rotatable and adjustable both in the azimuth direction ($\phi$) and in the elevation direction ($\theta$). The topology to be determined of the surface 1302 of a bulk material pile is also shown in FIG. 13.

The data capture corresponds in principle to the sequence sketched in FIG. 4 for the two-dimensional case, except that echo curves are now also detected over the elevation angle ($\theta$). FIG. 11 shows, by way of example, the echo curves detected in this context. Initially, for a fixed elevation angle $\theta_0$, the relevant range is passed through for the angle $\phi_i$. The echo curves 1103 thus detected are stored in the memory 1306 of the level measurement device. Subsequently, the elevation angle is changed to $\theta_1$, whereupon echo curves 1104 are in turn detected over the angular direction $\phi$. The method thus detects a number of echo curves from the relevant ranges for $\theta$ and $\phi$.

Figure 12:
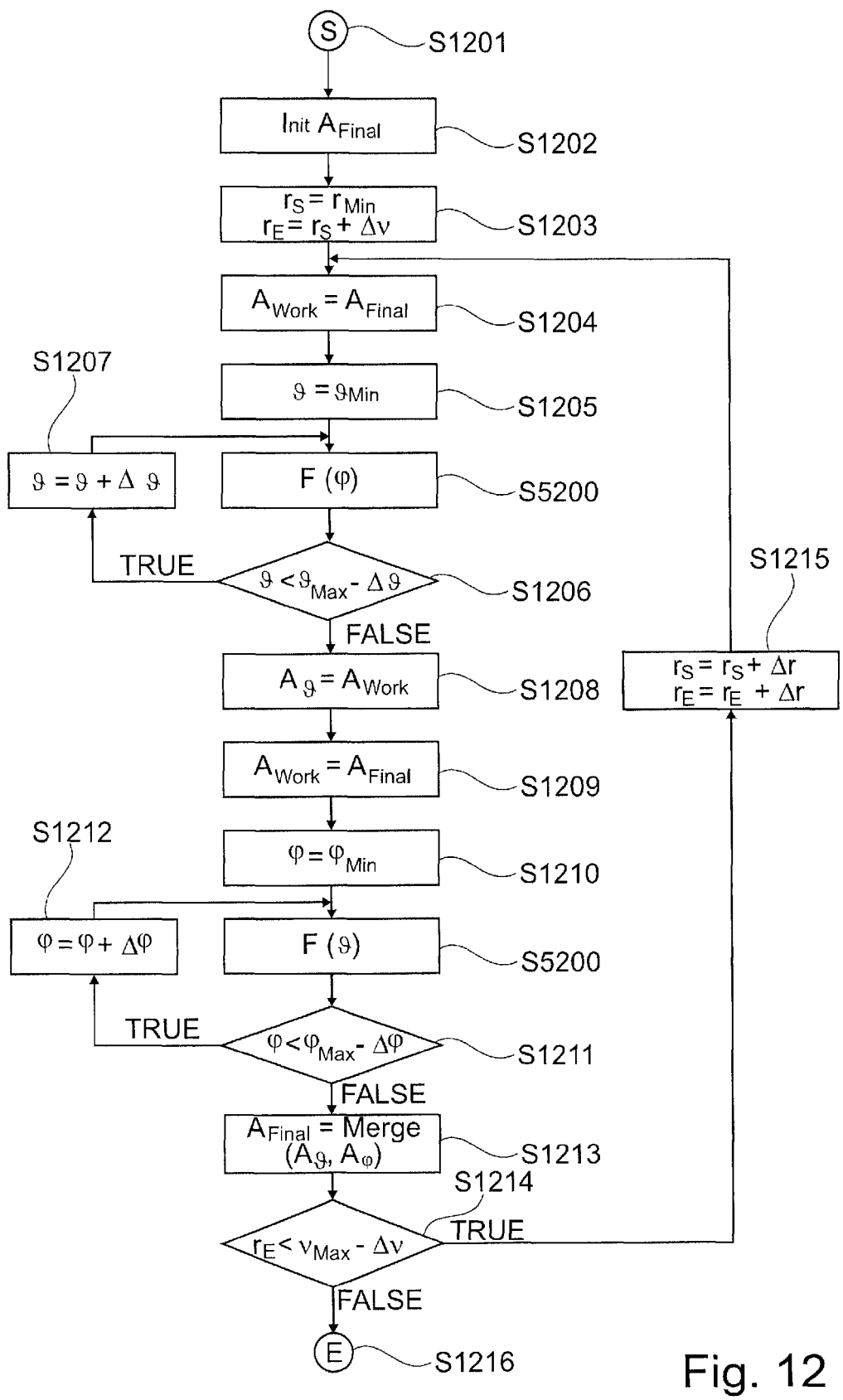
FIG. 12 is a flow chart of a method in accordance with an embodiment of the invention.

Once the data capture is complete, a topology of the bulk material surface 1302 is determined from the measured echo curves. FIG. 12 shows a suitable method for this purpose. For this purpose, the level measurement device comprises a memory 1306 for storing the values of four matrices $A_{Work}$, $A_{100}$, $A_\theta$, $A_{Final}$ which are each three-dimensional (cf. FIG. 13).

The method starts in the start state S1201. In step 1202, the results matrix $A_{Final}$ 802 is cleared. Subsequently, in step S1203, in a manner equivalent to step S5102 of FIG. 5, a distance cell is defined, which in the three-dimensional case represents a segment of a hollow sphere. In step 1204, the contents of the results matrix $A_{Final}$ are entered in the local work matrix $A_{Work}$.

In step S1205, by setting the elevation angle $\theta=\theta_{min\square}$, the evaluation is initially limited to the two-dimensional case. Consequently, in step S5200, conventional evaluation comprising steps S5201 to S5211 is carried out over two dimensions in accordance with the flow chart of FIG. 5. This calculation is performed using the work matrix $A_{Work}$. In steps S1206 and S1207, the evaluation is achieved over further angles $\theta$. Once these method steps have been passed through, the three-dimensional work matrix $A_{Work}$ is occupied by the maxima in the angular direction $\theta$.

As preparation for further evaluation, in step S1208 the three-dimensional work matrix $A_{Work}$ occupied in this manner is copied and stored at a separate point in the memory. The copied matrix may subsequently be denoted as $A_\theta$. Moreover, all of the entries of the original matrix are removed. Subsequently, in step S1209, the contents of the results matrix $A_{Final}$ are incorporated into the local work matrix $A_{Work}$.

In steps S1210 to S1212, the evaluation is carried out for each fixed azimuth angle $\phi$ by the method described above. Once these method steps have been passed through, the three-dimensional results matrix is occupied with the maxima in the angle direction $\phi$. The contents of the resulting matrix are incorporated into the matrix $A_\phi$ stored in the memory.

In step S1213, the results matrix $A_\phi$ is combined with the results matrix $A_\theta$ created in step S1208. A corresponding entry is entered in the final results matrix $A_{Final}$ stored in a third memory range if and only if both the matrix $A_\theta$ and the matrix $A_\phi$ have an entry at the coordinates $$\left[\frac{r_1 + r_2}{2}; \varphi_i; \vartheta_i\right].$$

In step S1214 and in step S1215, if necessary, there is a switch to the next distance cell (which may be in the form of a hollow sphere).

Once all of the relevant distance cells have been processed, the method ends in step S1216.

The entries in the results matrix generate an image of the topology of the bulk material surface 1302. If necessary, the position of further sampling points can be approximated using known interpolation methods. Further, the results matrix $A_{Final}$ can be converted from the representation in polar coordinates to a representation in Cartesian coordinates by known conversion methods.

FIG. 13 shows a measurement arrangement in accordance with an embodiment of the invention. A container 1309 is provided in which there is a bulk material 1302. It may also be possible to use the invention in connection with bulk piles without containers. In the upper region of the container there is a level measurement device 1300, which is attached movably to the top region of the container. A positioning device is provided for this purpose, which comprises a ball joint 1307, 1308 which makes it possible to adjust the orientation of the level measurement device along the angles $\phi$ and $\theta$. The positioning device comprises an actuator (not shown), which is connected to the processor 1304 of the level measurement device, in such a way that the primary radiation direction 1305 of the antenna arrangement 1301 of the level measurement device can be set fully automatically.

The reflected transmission signal received by the antenna is passed to the echo curve generation unit 1303, which generates an echo curve therefrom, which is subsequently passed to the processor, in other words the evaluation unit of the level measurement device. The processor 1304 is connected to a memory unit 1306, on which the echo curves and the topology data, from which the topology of the bulk material surface can be calculated, are stored.

Figure 14:
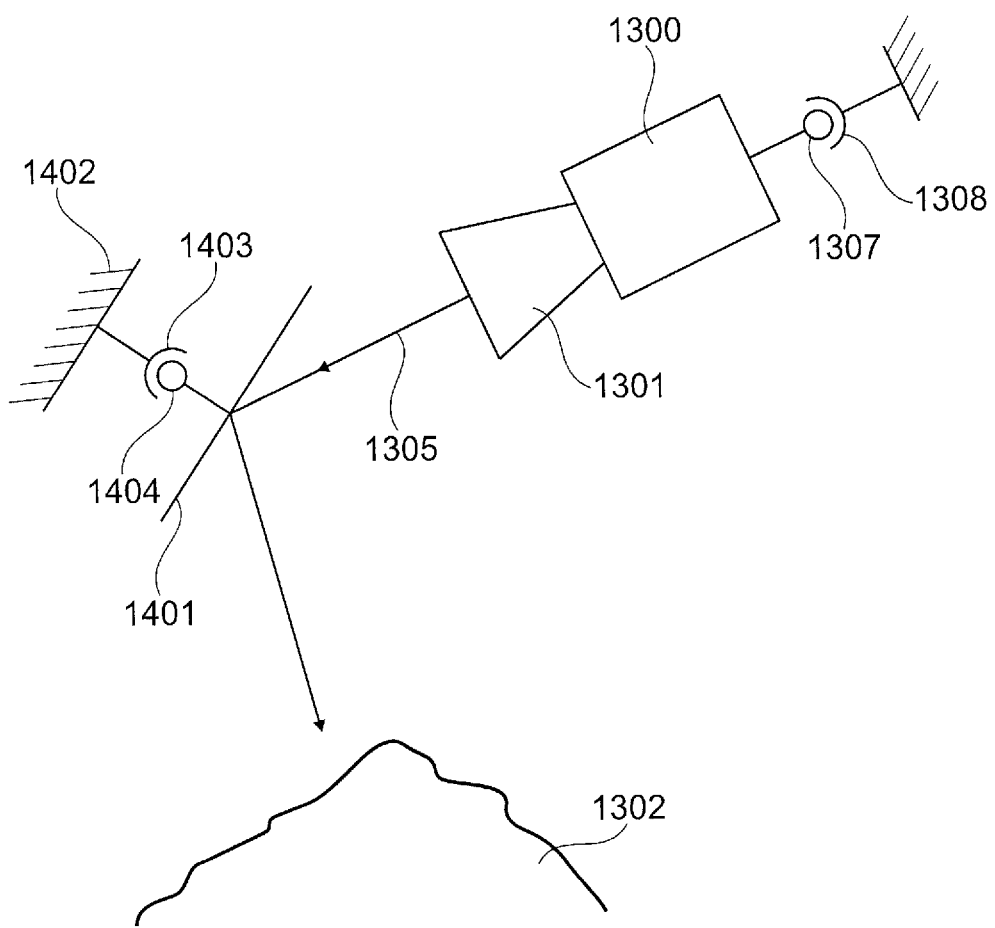
FIG. 14 shows a further measurement arrangement in accordance with an embodiment of the invention.

FIG. 14 shows a measurement arrangement in accordance with an embodiment of the invention. In this embodiment, a reflector 1401 is provided, which is located in the primary radiation direction 1305 of the antenna arrangement 1301 of the level measurement device and can be adjusted by means of the adjustment device 1403, 1404, which may also be in the form of a ball joint. The stationary part 1403 of the adjustment device is for example connected to the container wall 1402.

Likewise, the level measurement device may also be connected to the container wall via a separate adjustment device 1307, 1308, as in the embodiment of FIG. 13.

For example, it is possible for the level measurement device merely to be pivotable within one plane, and for the mirror to be pivotable in a second plane in such a way that the bulk material surface can be scanned over completely.

According to the invention, the topology of a bulk material surface can be determined using a single antenna. The antenna according to the invention may be selected from the group of horn antennas, rod antennas, patch antennas or any desired array antennas.

By comparing a number of echo curves in a defined region or a defined hollow sphere (distance cell), the lateral resolution of a conventional level measurement device can be further improved, without a plurality of sensors or a plurality of assembly positions being required for this purpose.

For completeness, it should be noted that "comprising" and "having" do not exclude the possibility of other elements or steps, and "an" or "a" does not exclude the possibility of a plurality. It should further be noted that features or steps which have been disclosed with reference to one of the above embodiments may also be used in combination with other features or steps of other above-disclosed embodiments. Reference numerals in the claims should not be treated as limiting.

The invention claimed is:

1. A measurement device configured to determine a topology of a bulk material, comprising:
    an antenna arrangement configured to emit a transmission signal in a primary radiation direction of the antenna arrangement and receive the transmission signal reflected at least on a surface of the bulk material;
    an echo curve generating unit configured to generate an echo curve, which corresponds to the signal strength of the reflected transmission signal over a distance measurement range of the measurement device, from the reflected transmission signal which is received by the antenna arrangement;
    a positioning device configured to change the primary radiation direction of the antenna arrangement in such a way that a series of echo curves can be generated at different primary radiation directions; and
    an evaluation unit configured to determine the topology of the bulk material, wherein the evaluation unit carries out the following steps to determine the topology:
        defining a plurality of adjacent distance cells in each of the series of echo curves, each distance cell corresponding to a distance interval within the distance measurement range of the measurement device;
        a) determining a first distance cell of the plurality of distance cells in each echo curve of the series of echo curves;
        b) determining one echo curve of the series of echo curves which has the greatest signal strength within the first distance cell of the one echo curve by comparison with the remaining echo curves;
        c) determining the coordinates of the greatest signal strength within the first distance cell of the one echo curve, which coordinates are the primary radiation direction, in which the transmission signal which corresponds to this echo curve was emitted, and the distance, which is within the first distance cell, corresponding to the greatest signal strength; and
        d) repeatedly carrying out steps a) to c) for all further distance cells of the plurality of adjacent distance cells,
    wherein the evaluation unit is configured to calculate at least one of a section line of the bulk material or a three-dimensional representation of the surface of the bulk material from data obtained in steps a) to d).

2. The measurement device according to claim 1, wherein the evaluation unit further carries out the following step to determine the topology:
    e) creating a matrix which contains the values of the coordinates as determined in steps c).

3. The measurement device according to claim 1, wherein the evaluation unit is configured to carry out the following step:
    f) determining a level or bulk material volume using the data obtained in steps a) to d).

4. The measurement device according to claim 1, wherein the positioning device is configured to change the primary radiation direction of the antenna arrangement in two dimensions.

5. The measurement device according to claim 1, wherein, for changing the primary radiation direction of the antenna arrangement, the positioning device further includes a mechanical adjustment device which sets an orientation of the antenna arrangement.

6. The measurement device according to claim 1, wherein the positioning device comprises a reflector changing the primary radiation direction of the antenna arrangement and a mechanical adjustment device changing the position of the reflector and thus the primary radiation direction of the antenna arrangement.

7. The measurement device according to claim 1, wherein the measurement device is configured as a level measurement device.

8. The measurement device according to claim 1, wherein the measurement device is configured as a pulsed radar device or an FMCW measurement device.

9. Use of a measurement device according to claim 1 for determining a volume flow of a bulk material which is located on a conveyor belt.

10. Use of a measurement device according to claim 1 for determining the mass of a hulk material.

11. A program element which, when executed on a processor of a measurement device, instructs the measurement device to carry out the following steps:
- emitting a transmission signal in a primary radiation direction of an antenna arrangement;
- receiving the transmission signal reflected at least on a surface of the bulk material;
- generating an echo curve, which corresponds to the signal strength of the reflected transmission signal over a distance measurement range of the measurement device, from the reflected transmission signal which is received by the antenna arrangement;
- changing the primary radiation direction of the antenna arrangement in such a way that a series of echo curves can be generated at different primary radiation directions;
- determining the topology of the bulk material, the following steps being carried out to determine the topology:
  - defining a plurality of adjacent distance cells in each of the series of echo curves, each distance cell corresponding to a distance interval within the distance measurement range of the measurement device;
  - a) determining a first distance cell of the plurality of distance cells in each echo curve of the series of echo curves;
  - b) determining one echo curve of the series of echo curves which has the greatest signal strength within the first distance cell of the one echo curve by comparison with the remaining echo curves;
  - c) determining the coordinates of the greatest signal strength within the first distance cell of the one echo curve, which coordinates are the primary radiation direction, in which the transmission signal which corresponds to this echo curve was emitted, and the distance, which is within the first distance cell, corresponding to the greatest signal strength; and
  - d) repeatedly carrying out steps a) to c) for all further distance cells of the plurality of adjacent distance cells; and
- calculating at least one of a section line of the bulk material or a three-dimensional representation of the surface of the bulk material from data obtained in steps a) to d).

12. A computer-readable medium, on which a program element is stored which, when executed on a processor of a measurement device, instructs the measurement device to carry out the following steps:
- emitting a transmission signal in a primary radiation direction of an antenna arrangement;
- receiving the transmission signal reflected at least on a surface of the bulk material;
- generating an echo curve, which corresponds to the signal strength of the reflected transmission signal over a distance measurement range of the measurement device, from the reflected transmission signal which is received by the antenna arrangement;
- changing the primary radiation direction of the antenna arrangement in such a way that a series of echo curves can be generated at different primary radiation directions;
- determining the topology of the bulk material, the following steps being carried out to determine the topology:
  - defining a plurality of adjacent distance cells in each of the series of echo curves, each distance cell corresponding to a distance interval within the distance measurement range of the measurement device;
  - a) determining a first distance cell of the plurality of distance cells in each echo curve of the series of echo curves;
  - b) determining one echo curve of the series of echo curves which has the greatest signal strength within the first distance cell of the one echo curve by comparison with the remaining echo curves;
  - c) determining the coordinates of the greatest signal strength within the first distance cell of the one echo curve, which coordinates are the primary radiation direction, in which the transmission signal which corresponds to this echo curve was emitted, and the distance, which is within the first distance cell, corresponding to the greatest signal strength; and
  - d) repeatedly carrying out steps a) to c) for all further distance cells of the plurality of adjacent distance cells; and
- calculating at least one of a section line of the bulk material or a three-dimensional representation of the surface of the bulk material from data obtained in steps a) to d).

* * * * *